United States Patent [19]

David

[11] Patent Number: 5,640,445
[45] Date of Patent: Jun. 17, 1997

[54] OUTBOUND CALL PACING METHOD WHICH STATISTICALLY MATCHES THE NUMBER OF CALLS DIALED TO THE NUMBER OF AVAILABLE OPERATORS

[75] Inventor: John E. David, Fairfield, Conn.

[73] Assignee: EIS International, Inc, Stamford, Conn.

[21] Appl. No.: 451,768

[22] Filed: May 26, 1995

[51] Int. Cl.⁶ .......................... H04M 15/00; H04M 3/00; H04M 5/00
[52] U.S. Cl. .......................... 379/113; 379/265; 379/266; 379/309
[58] Field of Search .................. 379/92, 113, 216, 379/265, 266, 309, 111, 112, 114

[56] References Cited

U.S. PATENT DOCUMENTS

| | | | |
|---|---|---|---|
| 4,800,583 | 1/1989 | Theis | 379/266 |
| 5,023,868 | 6/1991 | Davidson | 379/112 |
| 5,025,468 | 6/1991 | Sikand | 379/309 |
| 5,179,589 | 1/1993 | Syu | 379/265 |
| 5,185,780 | 2/1993 | Leggett | 379/113 |
| 5,295,184 | 3/1994 | Smith | 379/92 |
| 5,299,260 | 3/1994 | Shaio | 379/265 |
| 5,327,490 | 7/1994 | Cave | 379/216 |
| 5,341,412 | 8/1994 | Ramot | 379/92 |
| 5,436,965 | 7/1995 | Grossman | 379/266 |
| 5,463,685 | 10/1995 | Gaechter | 379/309 |
| 5,544,220 | 8/1996 | Trefzger | 379/266 |
| 5,553,133 | 9/1996 | Perkins | 379/266 |

*Primary Examiner*—Curtis Kuntz
*Assistant Examiner*—Vijay Shankar
*Attorney, Agent, or Firm*—Lane, Aitken & McCann

[57] ABSTRACT

Call pacing method in which agent availability and call answers are based on probability statistics and the allowable maximum abandon rate. A weight is assigned each agent engaged in a call or in after-call work. This weight is a function of how long an agent has been engaged in a call or in after-call work, the duration of a time window for which a prediction that the agent will be free is made, and the maximum allowable abandon call rate. The sum of the weights is the predicted number of engaged agents that will become free. The time window is independent of the interval between the dial of a call and when the call is expected to be answered and is automatically adjusted by the system; lengthened when the abandon call ratio falls below the acceptable ratio and shortened when the ratio rises above the acceptable ratio.

13 Claims, 9 Drawing Sheets

OUTBOUND CALL PACING METHOD WHICH STATISTICALLY MATCHES THE NUMBER OF CALLS DIALED TO THE NUMBER OF AVAILABLE OPERATORS

BACKGROUND OF THE INVENTION

1. Field of the Invention

This invention relates to an improved method for outbound telephone call pacing, and more particularly to a call pacing method that controls the rate at which calls are dialed to optimize agent utilization while maintaining the percentage of answered calls for which there is no available agent (so-called abandoned calls or nuisance calls) below a set maximum limit.

2. Description of the Prior Art

Call origination management systems automatically dial clients, listen for the call result (i.e. ringing, busy signal, answer, no answer, etc.), and when a call results in an answer, automatically transfer the call to an available agent. Such systems are in general use today by a variety of businesses, groups and organizations.

FIG. 1 shows a system overview of a typical system in use today. A system typically includes a call manager CPU 11, a call processor 13, and a memory such as a hard disk storage 15. A plurality of outbound telephone trunks 19 are connected to the call processor 13. A plurality of voice and data agent stations 21 are also connected to the system. The number M of these voice and data agent stations may be, for example, 24 for the case where the number of telephone lines is 48. In other words, the number M of the voice and data agent stations is less than the number of telephone trunks. This allows the system unit to dial calls while all operators are busy talking to clients.

As illustrated in FIG. 1, each of the voice and data terminal stations comprises a combination video display terminal (VDT) and keyboard, and a telephone headset and microphone. As will be appreciated by those skilled in the art, prior art call manager systems, such as those commercially available from applicant's assignee and others, include routines for gathering, manipulating and storing data relating to each call in a campaign. This data includes call duration data, after-call work duration, and call answer to dial call data.

The first step in beginning a calling campaign is to obtain the calling data, typically via tapes, disks, or through a communication link to a host computer. The data is input, and the system then organizes the data into the records for the campaign. When the campaign is started, the data is loaded into the "input call list." The system then preloads a dialing queue with a certain number of records from the calling data. As the dialing process begins, the system controls the number of calls being made at any one time based on the number of operators that are available to receive calls and the maximum allowable abandon call rate. An abandon call is a call that has been dialed, answered, but for which there is no available agent to respond to the answering party. These abandon calls are also referred to in the art as nuisance calls. The abandon call rate as used herein is the ratio of abandon calls to answered calls expressed as a percentage. The maximum abandon call rate is a rate which the system supervisor can select, usually in a range between 1% and 15%.

When a connection is established to a client, the system routes the call to an available agent and displays the client's record on the agent's screen. The agent is now ready to make a presentation to the client and record information from the transaction. Once the agent completes the call and any after-call work, the system then makes the agent station available for another call.

The system validates the client's record in an output call list, and, depending on the outcome of the call, separates the record in the corresponding output file. For example, if the particular person to be contacted is not at home, the operator may press a key telling the system to place the client's record into the call-back file. When, for example, a call results in a future follow-up call, the agent presses another key to immediately print information of the transaction on a printer.

Records which require no further action (i.e. a sale is made, wrong number, etc.), are marked complete and are not put into the call-back file but instead are put in a sale file.

The goal of any call origination management system is to have each agent connected to each call answered without having the agent wait between calls or the called party having to wait for an agent after he or she answers. Under ideal conditions, there would be maximum talk time and no abandon calls, so-called nuisance calls. To accomplish this, however, requires a prior knowledge of the time it takes to connect a call and exactly how long each operator talks. In practice, both of these can be highly variable, within limits. The system cannot predict exactly when or if a placed call will result in an answer and, of course, the amount of time an operator talks will depend on the responses of the client. Therefore, scheduling the next answered call to occur exactly when an operator finishes talking, is impossible. An answer may occur before or after the operator finishes the previous call, and the result is an increase in the abandon call rate it is clear that the system variables which affect talk time are the ratio of answered calls to the number of call attempts per session ($A_{ratio}$) and the average time an agent is busy per or an increase in operator idle time, or both. Intuitively, call in the session ($CON_{time}$). The system goal is a maximum talk time per agent with abandon calls kept below a preset level.

There are a number of call pacing methods in present commercial use. In general, these prior pacing methods attempt to predict when an agent will be available to respond to an answered call, and dial sufficient calls so that there will be an answered call for every available agent with a minimum time between the end of one call and the beginning of the next. The performance of these prior art pacing methods is generally satisfactory in a specific calling environment for which they are targeted and when operating with large number of agents and a high acceptable percentage of abandon calls. Their performance drops when used outside their targeted environment and when used with a small number of agents and/or a low acceptable percentage of nuisance calls.

SUMMARY OF THE INVENTION

An object of this invention is the provision of an improved call pacing method that can be used in a variety of calling environments.

Another object of this invention is the provision of a call pacing method that provides good agent utilization with small agent populations, and with low percentages of acceptable abandon calls.

Briefly this invention contemplates the provision of a call pacing method in which agent availability and call answers are based on probability statistics and the allowable maximum abandon rate. A weight is assigned each agent engaged in a call or in after-call work. This weight is a function of how long an agent has been engaged in a call or in after-call work, the length of adjustable time windows, and the maximum allowable abandon call rate. The sum of the weights is a predicted number of engaged agents that will become free. The length of the time windows is typically not the same for agents engaged in a call and agents engaged in after-call work and is not explicitly dependent on the interval between the dial of a call and when the call is expected to be answered. Each time window is separately adjusted by the system; respectively lengthened when the abandon call ratio falls below the acceptable ratio and shortened when the ratio rises above the acceptable ratio.

Calls to be dialed are separated into classes based on the probability that a dialed call will be answered (e.g. previously dialed, busy responses will have a higher probability of answer than a previously dialed no answer response). Separate data of answer vs. dials are kept for each class. Dialed calls that remain unanswered are further discounted as the unanswered status extends in time and the data indicates a diminished probability of being answered.

For each class, a number of calls to dial is calculated, based on the probability of an answer, in order to provide answered calls for the predicted number of idle agents without the predicted number of abandons exceeding the allowable abandon rate (as used herein, the phrase "predicted idle agents" (FS) includes engaged agents predicted to become available plus presently idle agents). Calls to dial are calculated from the various classes, starting with the class with the highest probability of an answer, so that the fewest dials are used to produce the required number of answered calls. For each class, the calculation of the number of calls to dial is based on an assumed binomial distribution of the likelihood of a given number of answers if the predicted number of idle agents divided by class answer probability is less than a predetermined number; if larger than this number a normal distribution is used for ease of calculation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
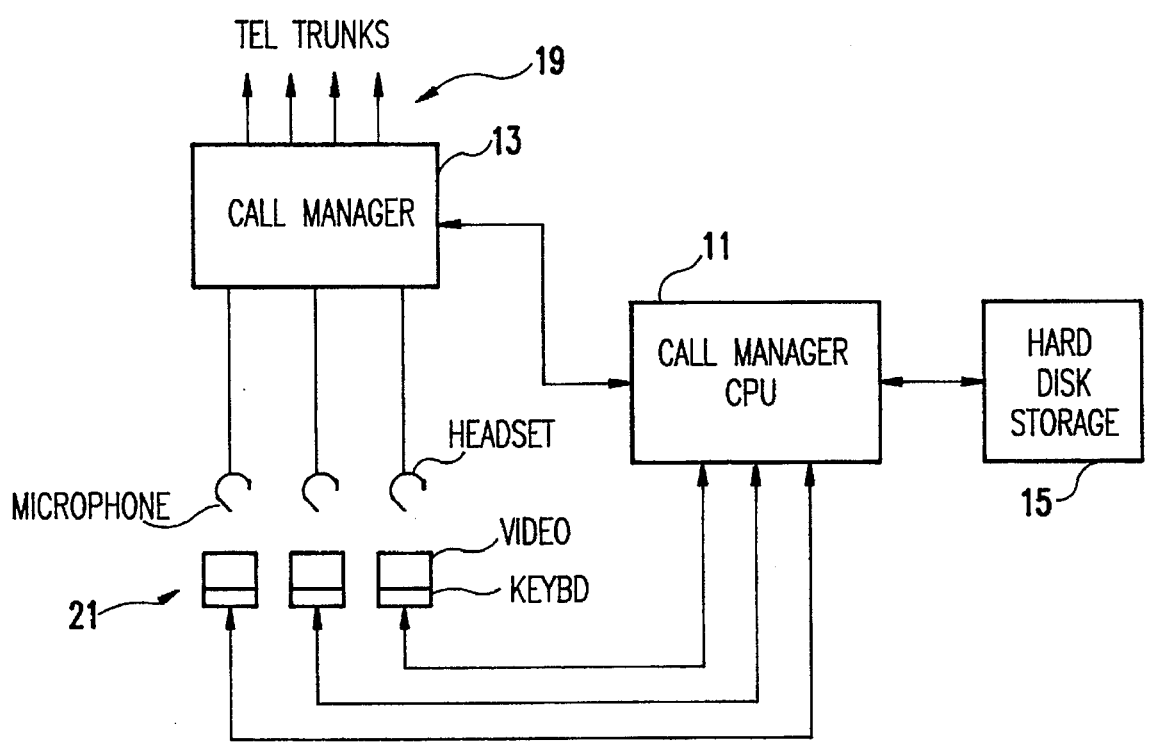
FIG. 1 is a high-level block diagram showing an overview of a typical telephone call origination management system.
Figure 2:
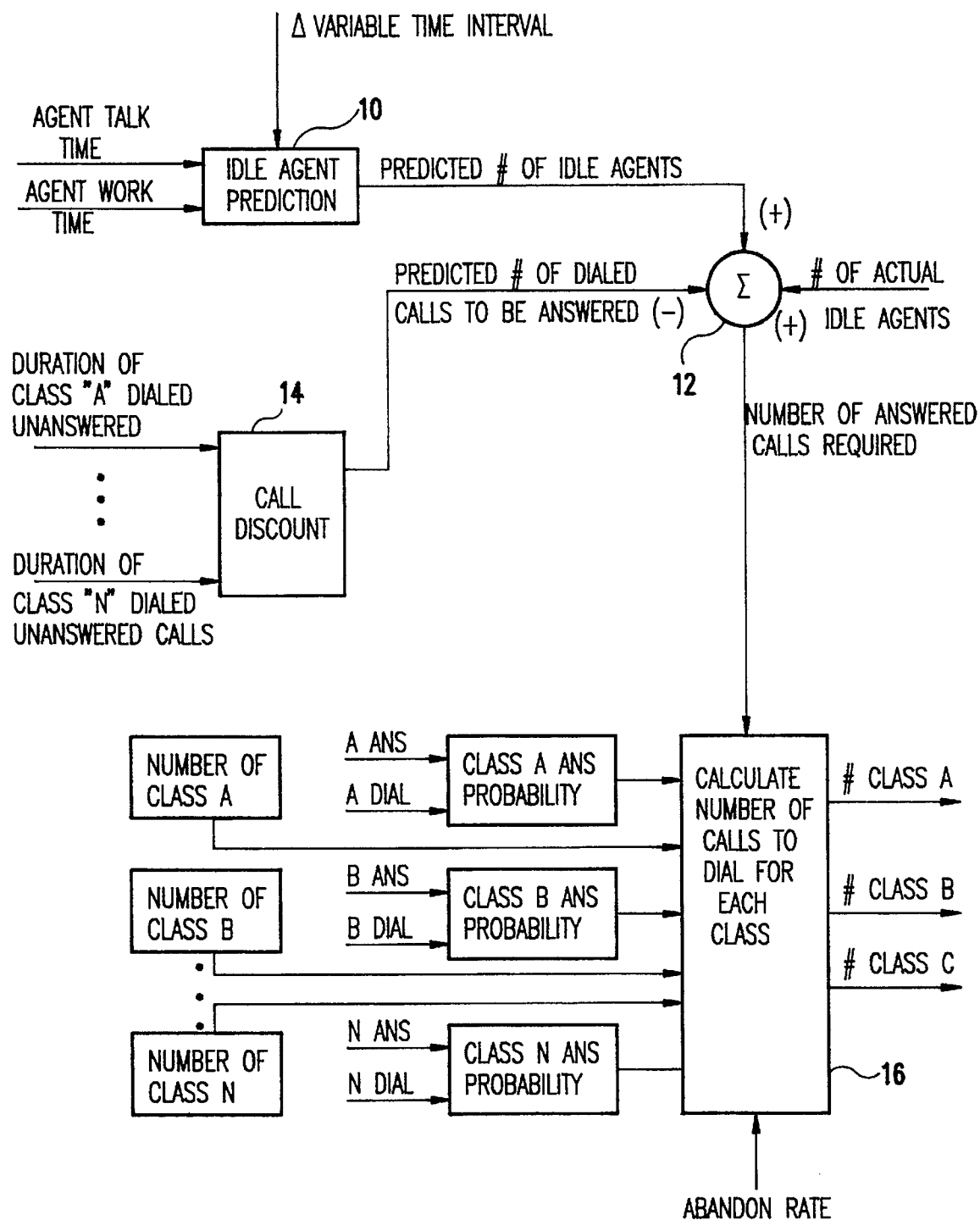
FIG. 2 is a functional block diagram of the overall call pacing method of the invention.

Referring now to FIG. 2, it illustrates functionally the operations performed in accordance with the teachings of the invention to determine a number of calls to dial. These operations provide a method to automatically dial from a list of telephone numbers for the purpose of connecting answers to a group of stations, subject to constraint. The constraint is that the ratio of unconnected answers, due to lack of free stations (i.e. so-called abandons or nuisance calls) to all answers cannot be more than a certain predefined ratio. This value is referred to herein as the maximum allowable abandon rate and is also known as the maximum nuisance call rate. This method takes into account the variability of both the time it takes for a call to answer and the time an agent station spends connected and in after-call work. Using a probability distribution, the method attempts to match the number of answers to the number of available agents within the abandon rate constraint. Each of the operations illustrated in FIG. 2 will be explained in further detail in connection with FIGS. 3–9.

A number of calls to dial is calculated periodically, for example, once every second. In connection with each calculation, an idle agent prediction routine 10 predicts the number of agents engaged in a call or in after-call work that will become idle within a time window $\Delta$. The predictive dialing routine 10 maintains a probability density function (PDF) for agents engaged in a call (PDF1) and a probability density function for agents engaged in after-call work (PDF2). It also establishes separate values of the time window $\Delta$; $\Delta 1$ for agents engaged in a call and $\Delta 2$ for agents engaged in after-call work. As will be explained in more detail in connection with FIGS. 3 and 4, for each agent engaged in a call or in after-call work, the elapsed time from the start of that call or the start of after-call work is monitored by the call manager 11. In addition, statistical data of elapsed time from call start to actual call completion for all agents and from start of after-call work until complete and available for a call is maintained and updated. From this data for all agents, a probability that each agent's call will terminate in a time interval $\Delta 1$ for calls in progress or $\Delta 2$ for after-call work in progress subsequent to the current time is calculated, and a total number of agents predicted to be available is based on a sum of predictive weights calculated from each probability using a logarithmic formula. The intervals $\Delta 1$ or $\Delta 2$ can be independently increased or decreased. Increasing either $\Delta$ makes the rate at which calls are dialed more aggressive and decreasing $\Delta$ makes the rate less aggressive. The output of this idle agent prediction routine unit 10 is coupled logically as one input to a summing junction 12. Another logical input of the summing junction is the number of agents actually idle. The sum of the number of predicted idle agents and the actual idle agents is the number of answers required to keep the agents busy.

As will be explained in more detail in connection with FIG. 6, a call discount routine 14 in call manager 11 predicts the number of calls that will be answered from among the calls that have been dialed, but for which there has been no answer at the time of the predictive calculation. The call manager 11 maintains data showing intervals from dial to answer for all calls for each class of calls. From this data, the probability a dialed but as yet incomplete call will be answered is calculated. An "incomplete call" as used herein means a call which has been dialed but for which no result (i.e. answer, busy, etc.) has been received by the dialer. The output of the call discount routine 14 is the number of expected answers for incomplete calls accounting for the lessening probability that a call will be answered the longer it is incomplete. The discount routine 14 sums the probabilities of each call being answered, and this sum is the predicted number of answers for dialed incomplete calls.

The output of discount routine 14 is subtracted at summing junction 12 from the number of answers required. The logical output of summing junction 12 is the number of answered calls required (over and above the expected answers from calls already dialed) to keep busy any presently idle agents and agents predicted to be idle.

A number of calls to dial routine 16 calculates the number of calls to dial for each class using an assumed probability distribution of answers versus dials. A binomial distribution is used if the number of required answers divided by the probability of an answer for that class is equal to or less than the number of predicted and actual idle agents. An assumed normal distribution is used if the number is greater than that. The number of dialed calls is calculated so the predicted number of answers equals the number of required answers without exceeding the allowable abandon rate (i.e. the maximum abandon rate). The call manager 11 maintains separate statistics of the ratio of answered calls to dialed calls for each of several different classes of calls; for example freshly dialed calls; previously dialed calls that resulted in a busy response; previously dialed calls which were not answered and rescheduled calls. Each of these classes can be expected to have a different probability that a dialed call will result in an answer and hence for each class a number of calls to dial is calculated based on the class answer probability.

For each class, there is a list of telephone numbers available for dialing. The number of answers and the number of calls dialed are kept by the call manager 11 and used as inputs to the routine 16. In addition, a value representing the allowable abandon rate is coupled as an input to the routine 16. Here it should be noted again, the system adjusts the allowable abandon rate value upwardly or downwardly, if the actual abandon rate falls below the maximum allowable rate or rises above the maximum allowable rate.

As will be explained in more detail in connection with FIG. 7, the calls-to-dial routine 16 starts with the class with the highest statistical probability of being answered and calculates, for that class, a number of dials such that predicted number of answers is less than or equal to the number of required answers. For each class, the predicted number of answers based on dials for that class is subtracted from the required number of answered calls, and the process repeated for the next class based on any remaining number of required answers. The calculation unit 16 outputs to the call processor a number of calls to dial for each class of calls and the processor commences placing calls.

Figure 3:
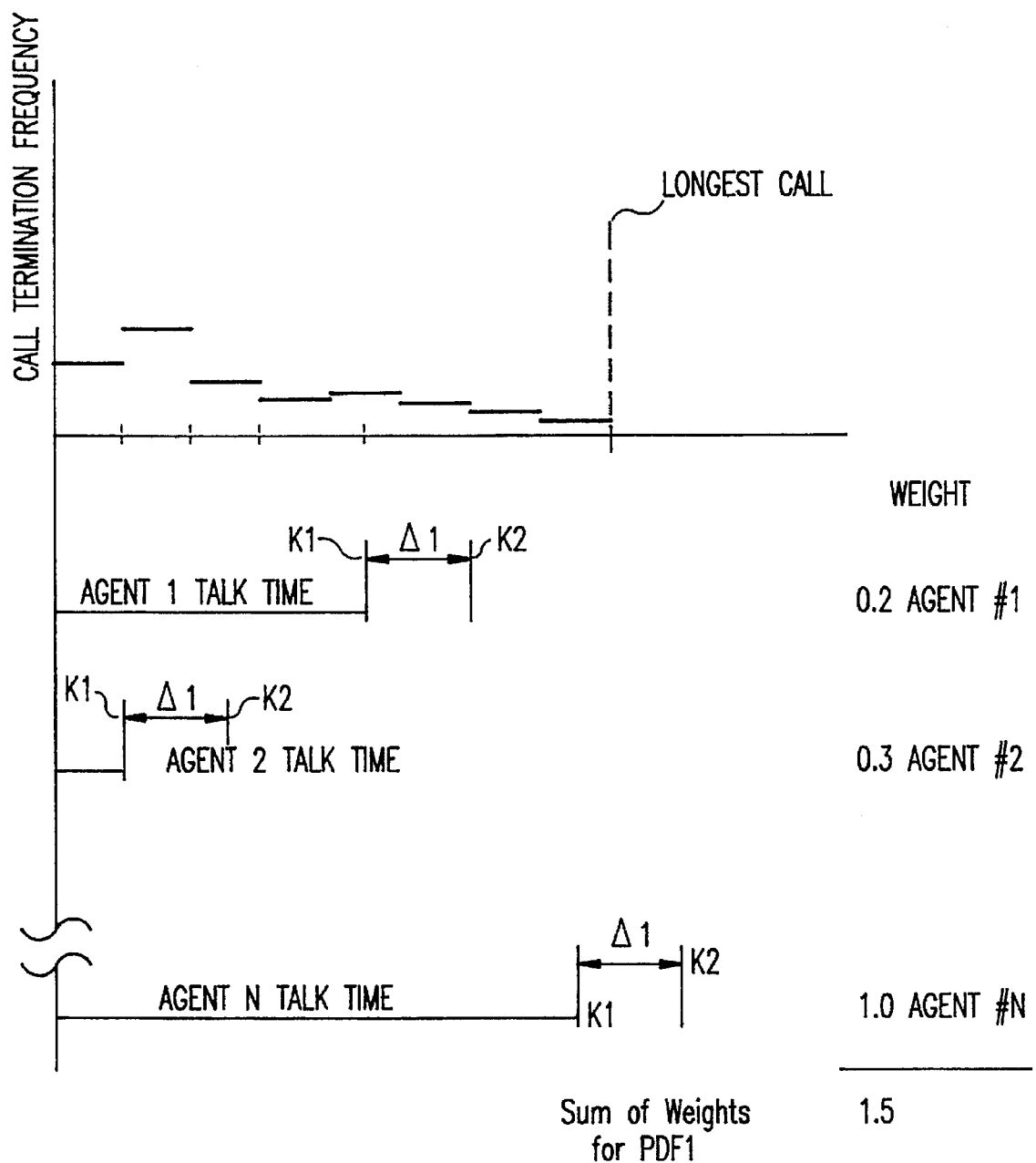
FIG. 3 is a histogram illustrating typical talk times for a class of calls.

Referring now to FIG. 3, the call processor maintains one probability density function (PDF1) of the time a call takes from connection to an agent until an agent becomes free. A typical distribution for PDF1 is graphically illustrated in FIG. 3. The probability density function (PDF1) is used to calculate a weight for each agent engaged in a call. This weight is a function of the probability that an agent will become available to take a new call within an interval $\Delta 1$ subsequent to the point in time at which the calculation is made.

Figure 5:
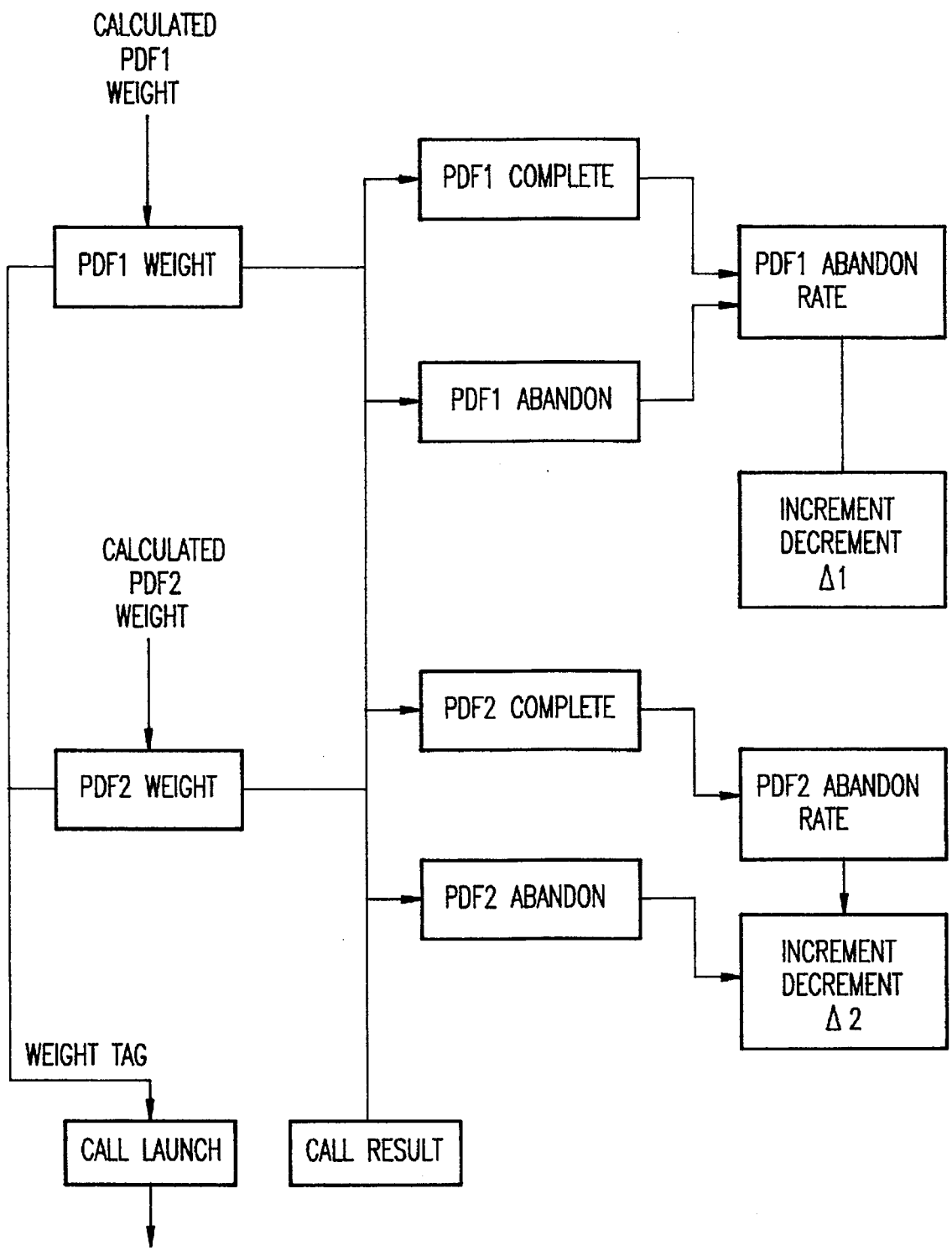
FIG. 5 is a functional block diagram illustrating the operation to adjust the time windows.

Similarly, the call processor maintains another probability density function (PDF2) of the elapsed time from when an agent begins after-call work until he is free. A typical distribution for PDF2 is illustrated in FIG. 5. The probability density function (PDF2) is used to calculate a weight for each agent engaged in after call work. This weight is a function of the probability that a agent will become available to take a new call within an interval $\Delta 2$ subsequent to the point in time at which the calculation is made. Here it should be noted that the intervals $\Delta 1$ and $\Delta 2$ are typically not the same and are typically set by a supervisor at the beginning of a campaign. In general, the higher the value of maximum allowable abandon rate setting, the larger will be the settings of the intervals $\Delta 1$ and $\Delta 2$, and the more aggressive will be the rate at which calls are dialed and vice versa. The data for PDF1 and for PDF2 is continuously updated as calls are answered, calls are completed, and after call work is completed during a campaign.

As explained previously, the predicted number of idle agents FS has three components; actually idle agents, predicted idle agents engaged in a call, and predicted idle agents engaged in after call work. The maximum number of calls to dial is equal to FS divided by the probability of an answer. As illustrated in FIG. 5, the call processor stores the weight FS1 calculated for agents engaged in a call and the weight FS2 calculated for agents engaged in after-call work. The call processor tags each call with the weights in the register at the time the call is launched. The call processor also maintains two answered call registers; one for PDF1 and one for PDF2. Also, it maintains two abandon call registers; one for PDF1 and one for PDF2. If a call is answered, the weights tagged to that call are used to increment the two answered call registers. If, in addition, the answered call is not connected to an agent (abandon), the weights tagged to that call are also used to increment the two abandon call registers.

Periodically (e.g. every 60 calls) the abandon rate attributed to PDF1 is calculated by dividing the value in the PDF1 abandon call register by the value in PDF1 answered call register. If this calculated abandon rate attributed to PDF1 is less that the maximum allowable abandon rate, the time interval $\Delta 1$ is increased by a predetermined incremental amount. If the abandon call rate attributed to PDF1 is greater than the maximum allowable abandon rate, the interval $\Delta 1$ is decremented by the predetermined incremental amount. Similarly, the abandon rate attributed to PDF2 is calculated by dividing the value in the PDF2 abandon call register by the value in the PDF2 answered call register. If this calculated abandon rate attributed to PDF2 is less than the maximum allowable abandon rate, the time interval $\Delta 2$ is increased by a predetermined incremental amount. If the abandon call rate attributed to PDF2 is greater than the maximum allowable abandon rate, the interval $\Delta 2$ is decremented by the predetermined incremental amount. The values used to increment $\Delta 1$ and $\Delta 2$ are not necessarily the same. Preferably, the call processor provides a dead zone, so that the values of $\Delta 1$ and $\Delta 2$ are incremented only if the calculated abandon rate is more than a certain percentage above or below the maximum abandon rate, for example 5%.

In predicting how many busy agents will soon become idle, a predictive weight is periodically (e.g. once a second) calculated for each agent engaged in a call or engaged in after-call work. This predictive weight is a function of the maximum allowable abandon rate and of the probability that an agent's call that has extended to time K1 will extend beyond K2, (i.e. $\Delta$ equals K2–K1).

Figure 4:
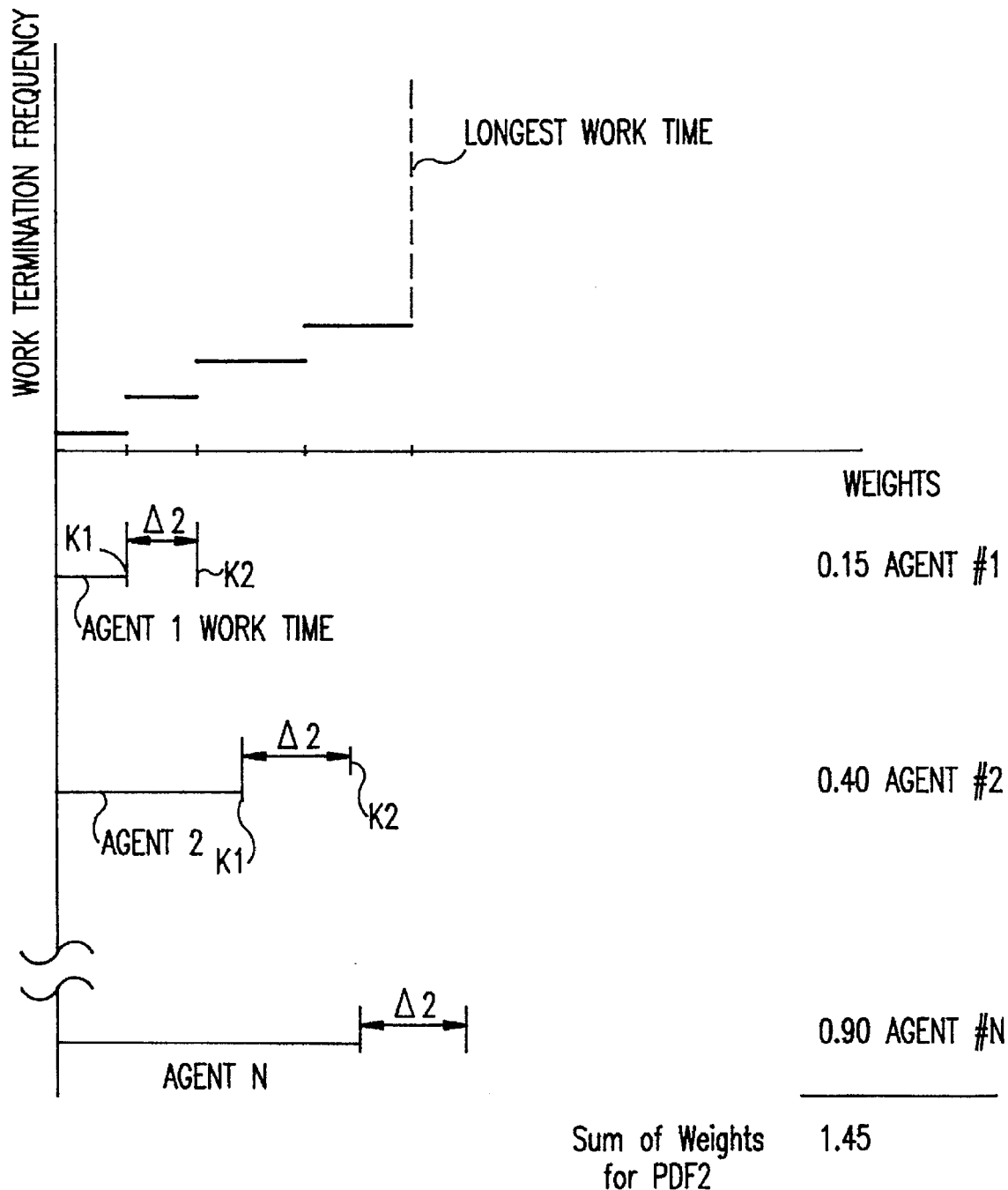
FIG. 4 is a histogram illustrating typical after-call work times.

Data of the duration of each call is collected and maintained for all agents. FIG. 3 illustrates a typical distribution of call termination for calls still in progress, in the form of a histogram, with the relative frequency of call completion (i.e. termination plus after-call work) in equal time intervals from the start of a call is represented by the height of the vertical bars. Here it should be noted that there is typically a high rate of call termination shortly after a call is answered. In a preferred embodiment of the invention, data relating to the agent after-call work time is separately kept for agents in an after-call state but not yet available. A typical histogram for after-call work is illustrated in FIG. 4. For agents in this after-call state, the agent weight is calculated in the same way as for agents engaged in a call but with the probabilities based on the after-call experience data. The total predicted weight, which is the sum of the predicted weights for stations engaged in calls and engaged in after-call activities, is the number of engaged agents predicted to become idle.

In determining a predictive weight for each agent, the probability density function PDF1 or PDF2 appropriate (i.e. engaged in a call or engaged in after-call work) for the agent is selected. For the selected PDF, define PI(K) to be the probability that a call will last at most K time. The weight (R) for this agent can be calculated as follows:

$$R = 1 - \frac{PI(K2) - PI(K1)}{1 - PI(K1)} - \frac{(PI(K2+1) - PI(K2))*F}{1 - PI(K1)}$$

where:
K1=current duration of the call in units of time per histogram unit (i.e. seconds)
K2=K1+Integer part of $\Delta$
F=Fractional part of $\Delta$.
If PI(K1) equals 1 or if K1 exceeds the domain of PI (e.g. the duration of call is greater than any previously observed call), no predictive weight is calculated for the agent.

The predictive weight for all agents is the sum of the ratios of natural logarithm of each agent to the natural logarithm of the maximum allowable abandon rate.

$$\text{PredictiveWeight} = \sum_{R(\text{agents})} \frac{\ln(R)}{\ln(\text{MaxAbandonRate})}$$

The sum of the weights calculated for each agent is used as the predicted number of agents presently engaged in a call that will be available. This number (e.g. 0.2+0.3+1.0=1.5) plus the number of idle agents determines (in part) the number of answers required and is used in determining the number of calls to dial.

Figure 6:
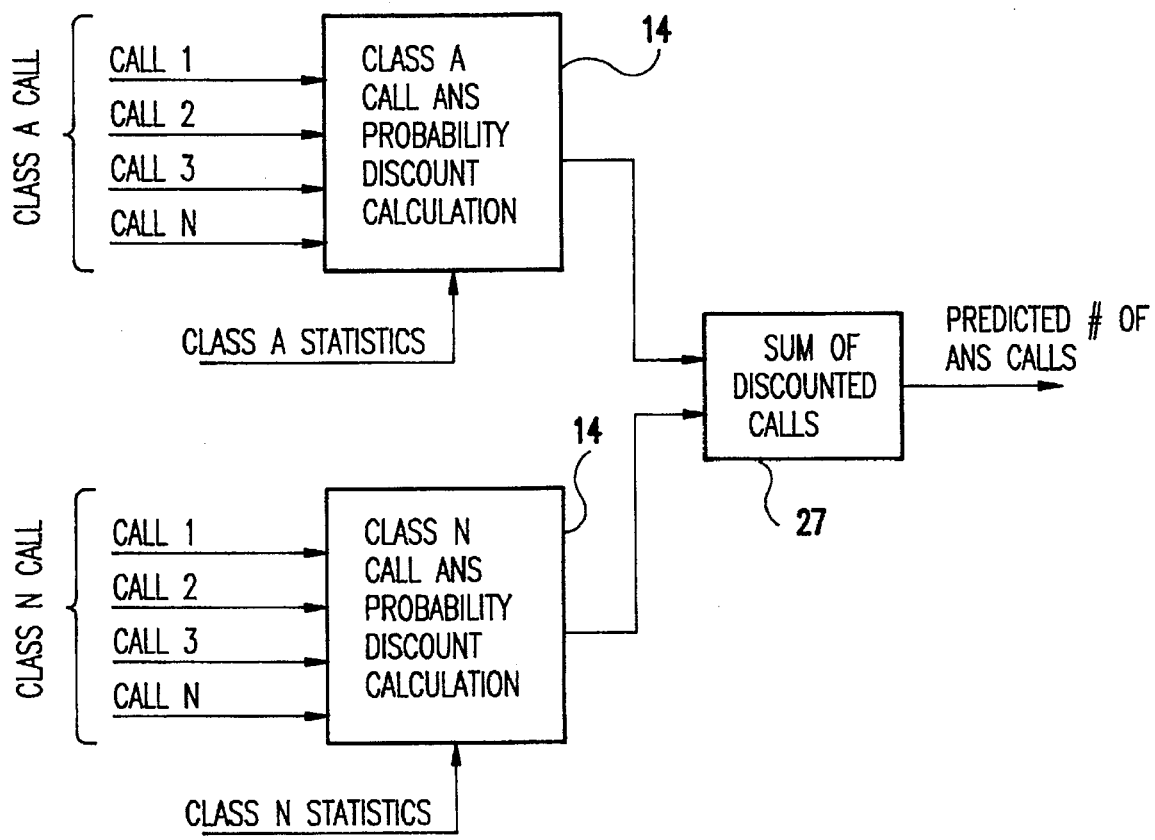
FIG. 6 is a block diagram illustrating the dial-in-progress discount method of the invention.

Referring now to FIG. 6, the calculation of the number of new calls to dial must take into account the calls previously dialed but which at the time of the calculation are incomplete. The system maintains continuously the number of answered calls and the number of call attempts for each class. The ratio of answers to attempts is the probability (P) that a call for this class will be answered. The initial probability a call will be answered is discounted as time goes forward and there is no answer. To this end, the number of calls answered as a function of elapsed time from initial dial is maintained for each class "C" of calls. The probability $P_{dialed\,ans}$ that a dialed call will result in an answer after it has been in progress for T seconds is equal to the ratio of the number of answers, ANS(C,T) where the dialed to answer interval lasted at least T seconds for the class to the sum of the number of answers ANS(C,T) and no answers, NOANS (C,T), lasting at least T seconds;

$$P_{dialed\,ans} = \frac{ANS(C,T)}{ANS(C,T) + NOANS(C,T)}$$

A call discount routine 14 calculates the discounted probability that each dialed, unanswered call will be answered based on the answer-nonanswer statistics for each class. A routine 27 sums these probabilities, and its output is the predicted number of dialed calls that will be answered. This output is logically subtracted from the number of required answers calculated based on the sum of the predicted idle agents and actual idle agents.

The declining probability of a call being answered is used to discount calls that have had a long elapsed time without producing an answer and, after a predetermined elapsed time, a call is preferably discounted to zero.

In determining the number of calls to dial, an assumption is made that the list of available numbers to dial for each class is such that answers will occur in a random fashion. The distribution of the ratio of answers to no answers is assumed to be a binomial function, i.e. a bell shaped distribution. As will be appreciated by those skilled in the art of statistics, the binomial distribution is a very well understood statistical distribution and is similar to the distribution of the ratio heads to tails that results from flipping a weighted coin. For example, if one were to flip a coin N times one can easily calculate the probability of getting K heads.

If there are five predicted available agents, dialing five calls cannot contribute to the abandon rate, assuming the number of predicted available agents are in fact available. Even if all five calls are answered, there is predicted to be five available agents. Dialing six or more calls presents some probability that there will be an abandon call. As explained previously, for each class of calls, the number of answered calls and dialed calls is maintained and their ratio is a probability P that a given call in that class will be answered. With the probability P that a call from the class will be answered, and an assumed binomial distribution in the ratio of answers to no answers, a probability can be calculated that each call in excess of the number of predicted available agents (e.g. 5+1, 5+2, 5+3 . . . ) will result in more answers than there are available agents (i.e. an abandon call). Using the probability data that a call will be answered and the assumed binomial distribution of answers to no answers, the routine 16 calculates a number of calls to dial such that predicted number of answered calls equals or exceeds the required answers to match the predicted and actual idle agents but the predicted abandon rate (i.e. predicted answered calls in excess of idle agents) is less than or equal to the maximum allowable abandon rate. The probability P of an answer is that of the class under consideration. If the number of dials N equals the number of actual idle stations plus predicted idle stations (FS) from the predicted weight calculation, there will not be any abandons. Because of the computational requirements of the binomial routine, its use may be subjected to a practical limitation so that it is used, for example, where FS/P is less than 30 and a normal distribution is used to calculate N where FS/P is, for example, greater than 30.

The following are two exemplary routines for calculating a number of calls to dial based on an assumed binomial distribution of answers. Example A is more aggressive than Example B.

EXAMPLE A

Purpose: Calculate the maximum number of calls that can be dialed without exceeding the maximum abandon rate, on average.
Input Variables: FS=available stations P=probability of an answer ABR=abandon rate
Output Variable: BINOMIAL1=number of calls to dial
Definitions: B(n,i)=binomial coefficient,n!/(i!*(n−i)!)
F=integer part of FS N=rounded integer part of FS/P
Method: Set N equal to FS/P. If ABR is greater or equal 1, or P is greater or equal 0.99 or N equals F, return. Otherwise starting with n=N, compute $$r = \sum_{i=F+1}^{n} B(n,i)P^i(1-P)^{n-i} \cdot (i-F)/i$$

which is the expected abandon rate. If r is less than or equal ABR return with BINOMIAL1 equal n. Otherwise decrement n, until either the above condition on r holds or n equals F.

EXAMPLE B

Purpose: Calculate the maximum number of calls that can be dialed without exceeding the maximum abandon rate, on average.

Input Variables: FS=available stations P=probability of an answer ABR=abandon rate Output Variable: BINOMIAL2=number of calls to dial Definitions: B(n,i)=binomial coefficient,n!/(i!*(n−i)!)
F=integer part of FS N=rounded integer part of FS/P Method: Set N equal to FS/P. If ABR is greater or equal 1, or P is greater or equal 0.99 or N equals F, return. Otherwise starting with n=N, compute $$r = \sum_{i=F+1}^{n} B(n,i)P^i(1-P)^{n-i} \cdot (i-F)$$

which is the expected number of abandons. If $$\frac{r}{N \cdot P}$$

is less than or equal ABR return with BINOMIAL2 equal n. Otherwise decrement n, until either the above condition on r holds or n equals F.

In order to optimize the operation of the system, the actual abandon rate is periodically calculated (e.g. every 60 answers) and compared to the maximum allowable abandon rate. If the actual abandon rate is less than the allowable abandon rate, the abandon rate used in the calculation of the number of calls to dial is increased incrementally. Conversely, if the actual abandon rate is greater than the allowable abandon rate, the rate used to calculate the number of calls to dial is decreased incrementally. In a specific embodiment of the invention, the rate is changed in 5% increments and no change is made if the actual rate is in a range between 90% and 100% of the nominal abandon rate.

Figure 7:
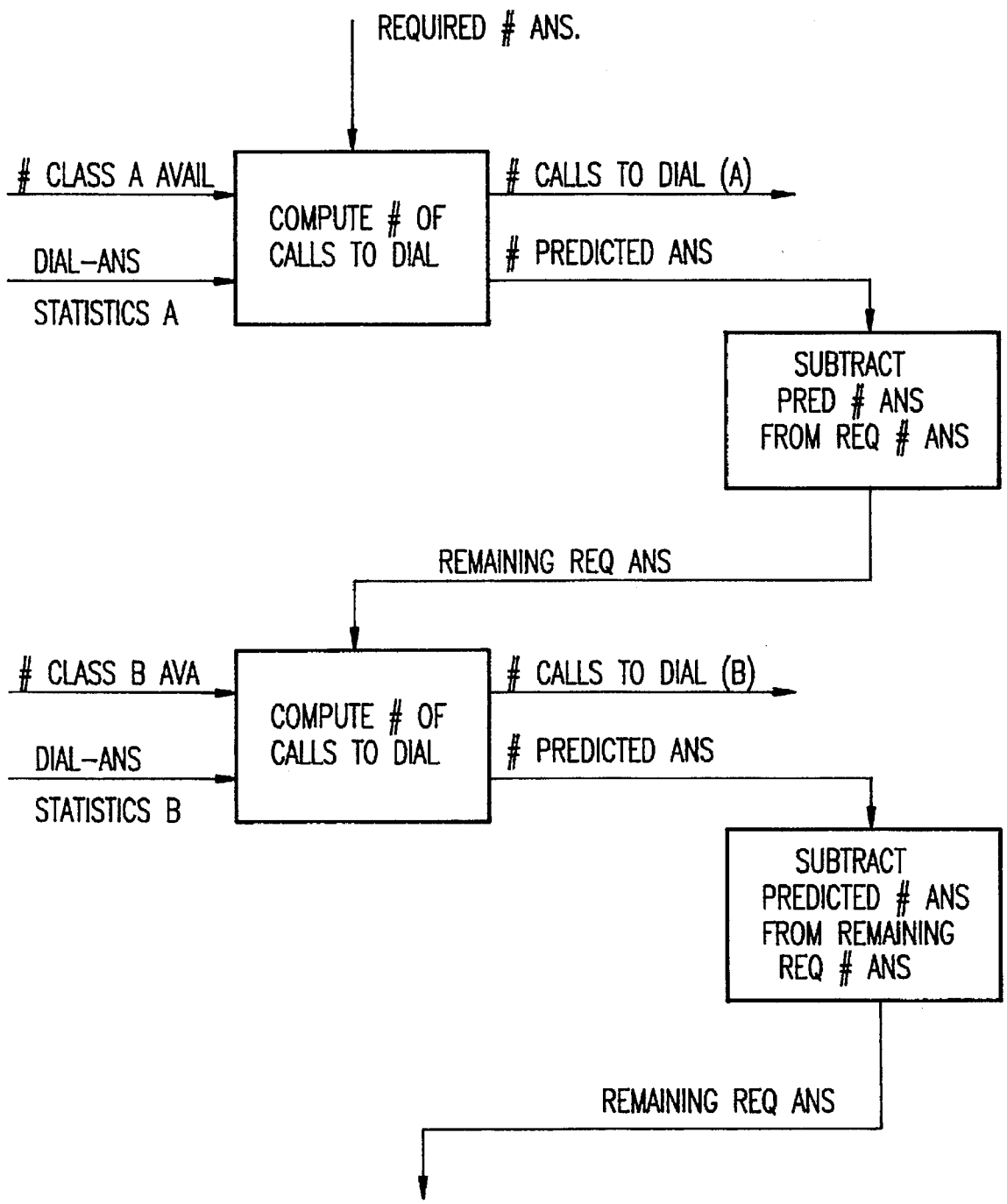
FIGS. 7 and 8 illustrate the call packing method of the invention.
Figure 8:
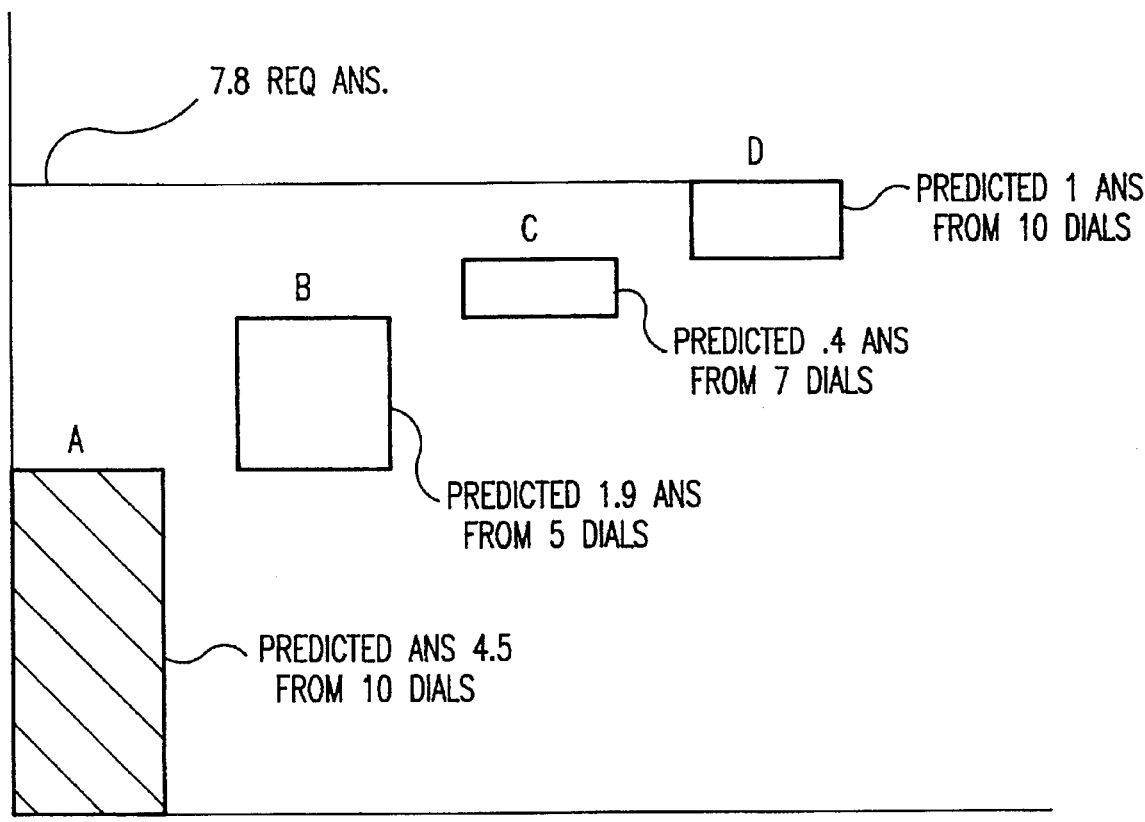

Referring now to FIGS. 7 and 8, a number of calls to dial is calculated for each class to "fit" the number of predicted answers to match the required number of answers. A number of calls to dial is calculated first for the class of calls with the highest probability of a call answer.

The calculation of the number of calls to dial for this class will usually result in a whole number and a fraction. Because of the lower probability of an answer from the next class, a whole number of calls to dial can usually be calculated which will result in a predicted number of answers from this class that, when added to the previous class or classes, will not exceed the required number of answers. In this way a number of calls to dial is calculated for each succeeding class based on the fraction from the preceding class so that the predicted number of answers mostly closely fits the predicted number of idle agents FS, as pictorially illustrated in FIG. 8.

In order to ensure that the present behavior of the system (call dial rate, etc.) is not adversely affected by short-term events, all historical data, including all probability density functions and multimodal time distributions, are "scaled-down" over time. This allows the system to react to realtime events in a timely fashion while also progressively discounting the importance of previous events as a function of time. Therefore, the algorithm remains flexible enough to react crisply to changing conditions, despite the possibility that those conditions may have been stable for many hours or many thousands of call attempts before.

For example, if there are 100 answers for 200 dials, the system stores the actual numbers (i.e. 100 and 200) rather than the ratio 0.5. Every so many answers these stored numbers are scaled. For example, every 200 answers the stored numbers are scaled by a factor of 0.9. The stored numbers in this example will be 90 and 180 after scaling, still giving a ratio of 0.5 but the weight of subsequent dials and answers is higher than the older, discounted values.

Figure 9:
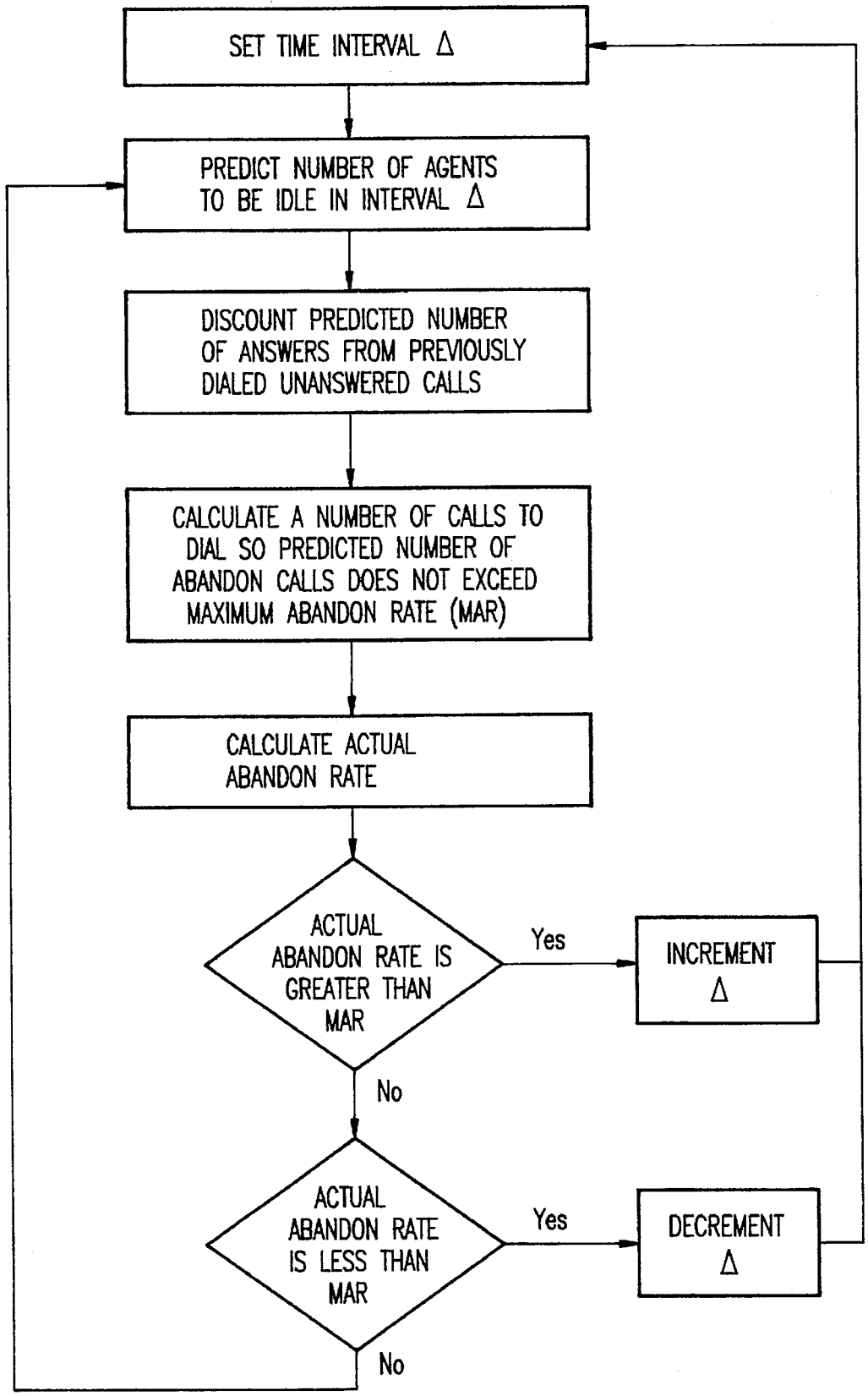
FIG. 9 is a flow diagram of the overall operation of the call pacing method of the invention.

FIG. 9 is a high level flow chart of the overall operation of the call pacing system.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for dialing from a list of telephone numbers in order to connect answers to a plurality of agent stations subject to a constraint that the ratio of all answers unconnected to an agent station, due to unavailability of an idle agent station, to all answers is less than a first value, said method comprising the steps of periodically:

a. predicting a number of agent stations then engaged in responding to an answered call that will become idle;
 b. said predicting step including calculating a predictive weight for each of said agent stations based on a call termination probability statistic that an agent who has been engaged in a call for a certain length of time will terminate that call within a succeeding first time interval, and summing the predictive weight for said each of said agent stations;
 c. calculating a number of calls to dial;
 d. dialing said number of calls to dial;
 e. repeating steps a. through d.;
 f. calculating said ratio of said all answers unconnected to an agent station to said all answers after step e. has been repeated a predetermined number of times;
 g. if said ratio calculated in step f. exceeds said first value, shortening said first time interval and if said ratio is less than said first value lengthening said first time interval.

2. A method for dialing as in claim 1 wherein said calculating a number of calls to dial step is based on a ratio of answered calls to calls previously dialed from said list and an assumption that the distribution of answered calls is a binomial function.

3. A method for dialing as in claim 2 wherein there is a plurality of said list of telephone numbers, one of said plurality of said list being comprised of telephone numbers that have not been previously dialed during a campaign and another of said plurality of said list being comprised of telephone numbers that have been previously dialed during said campaign, and wherein a number of calls to dial is calculated separately for each of said plurality of said list.

4. A method for dialing as in claim 2 wherein said calculation of a number of calls to dial includes a step of including a number of dialed, unanswered calls based on a probability that said dialed, unanswered calls will be answered discounted as a function of the duration during which each call has been in a dialed, unanswered state.

5. A method for dialing as in claim 1 wherein there is a plurality of said list of telephone numbers, one of said plurality of said list being comprised of telephone numbers that have not been previously dialed during a campaign and another of said plurality of said list being comprised of telephone numbers that have been previously dialed during said campaign, and wherein a number of calls to dial is calculated separately for each of said plurality of said list.

6. A method for dialing as in claim 5 wherein said calculation of a number of calls to dial includes a step of including a number of dialed, unanswered calls based on a probability that said dialed, unanswered calls will be answered discounted as a function of the duration during which each call has been in a dialed, unanswered state.

7. A method for dialing as in claim 1 wherein said calculation of a number of calls to dial includes a step of including a number of dialed, unanswered calls based on a probability that said dialed, unanswered calls will be answered discounted as a function of the duration during which each call has been in a dialed, unanswered state.

8. A method for dialing from a list of telephone numbers in order to connect answers to a plurality of agent stations subject to a constraint that the ratio of all answers unconnected to an agent station, due to unavailability of an idle agent station, to all answers is less than a first value, said method comprising the steps of periodically:

a. predicting a number of answered calls based on a statistical probability calculated from a ratio of answered calls to calls previously dialed from said list and an assumption that the probability distribution that a number of dialed calls will result in a number of answered calls is a binomial function;
   b. calculating a number of calls to dial so that the number of answered calls predicted in said predicting step in excess of the number of idle agent stations is less than said first value; and
   c. dialing said number of calls to dial.

9. A method for dialing as in claim 8 wherein there is a plurality of said list of telephone numbers, one of said plurality of said list being comprised of telephone numbers that have not been previously dialed during a campaign and another of said plurality of said list being comprised of telephone numbers that have been previously dialed during said campaign, and wherein a number of calls to dial is calculated separately for each of said plurality of said list.

10. A method for dialing as in claim 8 wherein said calculation of a number of calls to dial includes a step of including a number of dialed, unanswered calls based on a probability that said dialed, unanswered calls will be answered discounted as a function of the duration during which each call has been in a dialed, unanswered state.

11. A method for dialing from a list of telephone numbers in order to connect answers to a plurality of agent stations subject to a constraint that the ratio of all answers unconnected to an agent station, due to unavailability of an idle agent station, to all answers is less than a first value, said method comprising the steps of periodically:

a. predicting a number of agent stations engaged in a call that will become idle based upon a statistical probability that each agent engaged in a call will become idle within a succeeding first time interval;
   b. calculating a number of calls to dial, including predicting a number of answered calls based on a ratio of answered calls to calls previously dialed from said list and an assumption that the distribution of answered calls is a binomial function;
   c. dialing said number of calls to dial;
   d. repeating steps a. through c.;
   e. calculating said ratio of said all answers unconnected to an agent station to said all answers after step d. has been repeated a predetermined number of times;
   f. if said ratio calculated in step e. exceeds said first value, shortening said first time interval and if said ratio is less than said first value lengthening said first time interval.

12. A method for dialing from a plurality of lists of telephone numbers in order to connect answers to a plurality of agent stations subject to a constraint that the ratio of all answers unconnected to an agent station, due to unavailability of an idle agent station, to all answers is less than a first value, one of said plurality of said list being comprised of telephone numbers that have not been previously dialed during a campaign and another of said plurality of said list being comprised of telephone numbers that have been previously dialed during said campaign, said method comprising the steps of periodically:

a. predicting a number of agent stations engaged in a call that will become idle based upon a statistical probability that each agent engaged in a call will become idle within a succeeding first time interval;
   b. calculating a number of calls to dial separately for each of said plurality of lists;
   c. dialing said number of calls to dial;
   d. repeating steps a. through c.;
   e. calculating said ratio of said all answers unconnected to an agent station to said all answers after step d. has been repeated a predetermined number of times;
   f. if said ratio calculated in step e. exceeds said first value, shortening said first time interval and if said ratio is less than said first value lengthening said first time interval and wherein a number of calls to dial is calculated separately for each of said plurality of said lists.

13. A method for dialing as in claim 12 wherein said calculation of a number of calls to dial includes a step of including a number of dialed, unanswered calls based on a probability that said dialed, unanswered calls will be answered discounted as a function of the duration during which each call has been in a dialed, unanswered state.

\* \* \* \* \*